United States Patent
Challa et al.

(10) Patent No.: US 11,302,095 B2
(45) Date of Patent: Apr. 12, 2022

(54) COGNITIVE MOTION PICTURE ANALYSIS

(71) Applicant: International Business Machines Corporation, Armonk, NY (US)

(72) Inventors: Avinash Challa, Visakhapatnam (IN); Mary Salins, Visakhapatnam (IN); Sunil Kumar V. Vadapalli, Visakhapatnam (IN); Archana Ponnada, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 16/738,090

(22) Filed: Jan. 9, 2020

(65) Prior Publication Data

US 2021/0216807 A1 Jul. 15, 2021

(51) Int. Cl.
*G06V 10/75* (2022.01)
*G06F 40/279* (2020.01)
(Continued)

(52) U.S. Cl.
CPC .......... *G06V 10/751* (2022.01); *G06F 40/279* (2020.01); *G06N 20/00* (2019.01); *G06V 20/10* (2022.01); *G06V 20/46* (2022.01)

(58) Field of Classification Search
CPC ........ G06V 20/40; G06V 20/52; G06V 20/20; G06V 20/49; G06V 10/82; G06V 20/46;
(Continued)

(56) References Cited

U.S. PATENT DOCUMENTS 7,876,355 B2   1/2011   Stevens
8,259,806 B2   9/2012   Radhakrishnan et al.
(Continued)

FOREIGN PATENT DOCUMENTS

| CA | 3102984 A1 * | 12/2019 | ....... G06F 16/24534 |
| CN | 102177726 A | 9/2011 | |
| EP | 1021040 A2 | 7/2000 | |

OTHER PUBLICATIONS

Tracking with Local Spatio-Temporal Motion Patterns in Extremely Crowded Scenes—2010 (Year: 2010).*
(Continued)

*Primary Examiner* — Nizar N Sivji
(74) *Attorney, Agent, or Firm* — Edell, Shapiro & Finnan, LLC

(57) ABSTRACT

A computer-implemented method, a system, and a computer program product are provided. Each frame of a scene of a motion picture is analyzed, using one or more machine learning trained models, to identify objects and respective positions of the identified objects in the scene. Inconsistencies in the frames are determined via at least one machine learning trained model, wherein the inconsistencies include one or more from a group of: a change of at least one position of the identified objects in the scene; an appearance or disappearance of at least one of the identified objects in the scene based on contiguous frames; and at least one of the identified objects being inconsistent with respect to a time period of the scene. Resulting information regarding the detected inconsistencies in the frames of the scene is provided to adjust the frames.

20 Claims, 7 Drawing Sheets

(51) Int. Cl.
*G06N 20/00* (2019.01)
*G06V 20/10* (2022.01)
*G06V 20/40* (2022.01)

(58) Field of Classification Search
CPC ...... G06V 20/10; G06V 10/751; G06F 16/71; G06F 40/279; G06F 40/20; G06N 20/00; G06N 3/0454; G06N 20/20; G06N 3/08; G06K 9/6201
See application file for complete search history.

(56) References Cited

U.S. PATENT DOCUMENTS

| | | | |
|---|---|---|---|
| 9,106,812 | B1 | 8/2015 | Price et al. |
| 2009/0141940 | A1* | 6/2009 | Zhao ...................... G06V 20/40 382/103 |
| 2015/0189130 | A1 | 7/2015 | Milosevski et al. |
| 2015/0340068 | A1 | 11/2015 | Bekmambetov et al. |
| 2016/0358629 | A1 | 12/2016 | Pribula |
| 2017/0270363 | A1* | 9/2017 | Polak ...................... G06V 20/49 |
| 2018/0082127 | A1* | 3/2018 | Carlson .................. G06V 20/49 |
| 2018/0336424 | A1* | 11/2018 | Jang .................. B60W 30/0956 |
| 2019/0130583 | A1* | 5/2019 | Chen .......................... G06T 7/11 |
| 2019/0394350 | A1* | 12/2019 | Pangasa .................... G06T 7/97 |
| 2020/0341100 | A1* | 10/2020 | Heukensfeldt Jansen .................... G06V 10/993 |

OTHER PUBLICATIONS

Progressive Latent Models for Self-Learning Scene-Specific Pedestrian Detectors—2020 (Year: 2020).*
Improving Multi-view Object Recognition by Detecting Changes in Point Clouds—2016 (Year: 2016).*
S. Basu, "5 Websites For Catching Movie Goofs & Bloopers", https://www.makeuseof.com/tag/5-websites-catching-movie-goofs-bloopers/, Mar. 1, 2011.

* cited by examiner

COGNITIVE MOTION PICTURE ANALYSIS

BACKGROUND

1. Technical Field

Present invention embodiments relate to technology for analyzing and improving motion pictures, and more specifically, to analysis of motion pictures to find inconsistencies and provide resulting information regarding the detected inconsistencies to adjust frames of the motion pictures.

2. Discussion of the Related Art

Motion pictures may have a number of mistakes and inconsistencies that critics may point out in their reviews. For example, some movies may inadvertently include at least a portion of a microphone or a shadow of the microphone in one or more scenes. Some movie scenes may include objects that may suddenly appear or disappear in the scene, may suddenly have a different color, or an actor may suddenly appear in different clothes or with parts of his or her body suddenly in a different position. Further, some movie scenes may include objects or sounds that may be out of place for a time period or a location of the movie scenes. Some examples may include a wristwatch on a Roman soldier, a sound of a helicopter hovering over the Parthenon in ancient Greece, and palm trees appearing in a scene supposedly located in Siberia.

SUMMARY

According to one embodiment of the present invention, a computer-implemented method is provided for processing frames of a motion picture. Using one or more machine learning trained models, at least one computing device analyzes each of the frames of a scene to identify objects and respective positions of the identified objects in the scene. Inconsistencies in the frames are determined via at least one machine learning trained model. The inconsistencies include one or more from a group of: a change of at least one position of the identified object in the scene; an appearance or disappearance of at least one of the identified object in the scene based on contiguous frames; and at least one of the identified objects being inconsistent with respect to a time period of the scene. Resulting information regarding the detected inconsistencies in the frames is provided to adjust the frames.

According to a second embodiment of the invention, a system for processing frames of a motion picture is provided. The system includes at least one processor and at least one memory. Each of the at least one memory is connected with a respective processor of the at least one processor. The at least one processor is configured to use one or more machine learning trained models to analyze each of the frames of a scene to identify objects and respective positions of the identified objects in the scene. Inconsistencies in the frames are determined via at least one machine learning trained model. The inconsistencies include one or more from a group of: a change of at least one position of the identified objects in the scene; an appearance or disappearance of at least one of the identified objects in the scene based on contiguous frames; and at least one of the identified objects being inconsistent with respect to a time period of the scene. Resulting information is provided regarding the detected inconsistencies in the frames to adjust the frames.

According to a third embodiment, a computer program product is provided for processing frames of a motion picture. The computer program product includes at least one computer readable storage medium having computer readable program code embodied therewith for execution on one or more processors. The computer readable program code is configured to be executed by the one or more processors to cause the one or more processors to analyze each frame of a scene, using one or more machine learning trained models to identify objects and respective positions of the identified objects in the scene. Inconsistencies in the frames are determined via at least one machine learning trained model. The inconsistencies include one or more from a group of: a change of at least one position of the identified objects in the scene; an appearance or disappearance of at least one of the identified objects in the scene based on contiguous frames; and at least one of the identified objects being inconsistent with respect to a time period of the scene. Resulting information is provided regarding the detected inconsistencies in the frames to adjust the frames.

BRIEF DESCRIPTION OF THE DRAWINGS

Generally, like reference numerals in the various figures are utilized to designate like components.

DETAILED DESCRIPTION

In this application, the term "motion picture" is defined to include any type of video, including moving images produced from film, which may have a sound track recorded thereon, as well as moving images recorded on videotape and in video files, which when played cause a moving image to be displayed with or without corresponding audio.

In various embodiments, one or more computing devices may use one or more machine learning trained models to analyze frames of one or more scenes of a motion picture in order to identify mistakes and out of place objects in the scenes. For example, the one or more machine learning trained models may analyze multiple frames of a scene from a motion picture to identify objects in the scene as well as respective positions of the identified objects and to determine inconsistencies in the scene. The analyzing may include detecting one or more objects having a sudden change in position within the scene, any of the one or more objects suddenly appearing or suddenly disappearing in the scene, and objects appearing in the scene that are out of place with respect to a time period of the scene, a location of the scene, or both the time period of the scene and the location of the scene. Further, some embodiments may receive input regarding a related motion picture and may analyze information from multiple sources to identify elements of the related motion picture that contributed to its success. Using the identified elements, embodiments may make recommendations regarding a new related motion picture.

Figure 1:
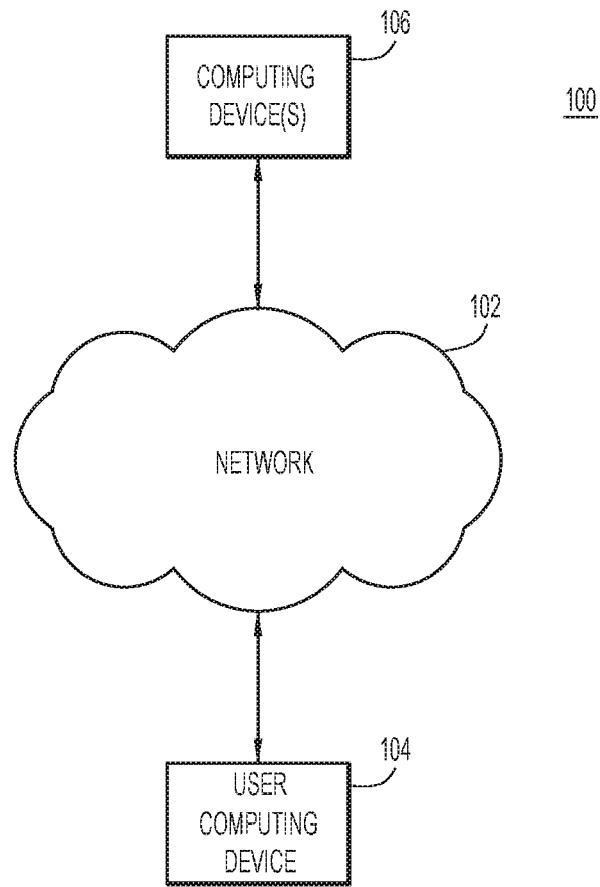
FIG. 1 is a diagrammatic illustration of an example computing environment according to an embodiment of the present invention.

With reference now to FIG. 1, an example environment 100 is shown in which various embodiments may operate. Example environment 100 may include a network 102, a user computing device 104, and one or more computing devices 106. Computing device 104 and one or more computing devices 106 may be remote from each other and may communicate over network 102. Network 102 may be implemented by any number of any suitable communications media (e.g., wide area network (WAN), local area network (LAN), Internet, Intranet, etc.) or any combination thereof. Alternatively, computing device 104 and one or more computing devices 106 may be local to each other and may communicate via any appropriate local communication medium (e.g., local area network (LAN), hardwire, wireless link, Intranet, etc.).

In this specification, a reference to computing device 106 can be interpreted as referring to either a single computing device or multiple clustered computing devices. In some embodiments, computing device 106 may include a single server or multiple servers configured as a server farm. Computing devices 104, 106 may be implemented by any conventional or other computer system.

Figure 2:
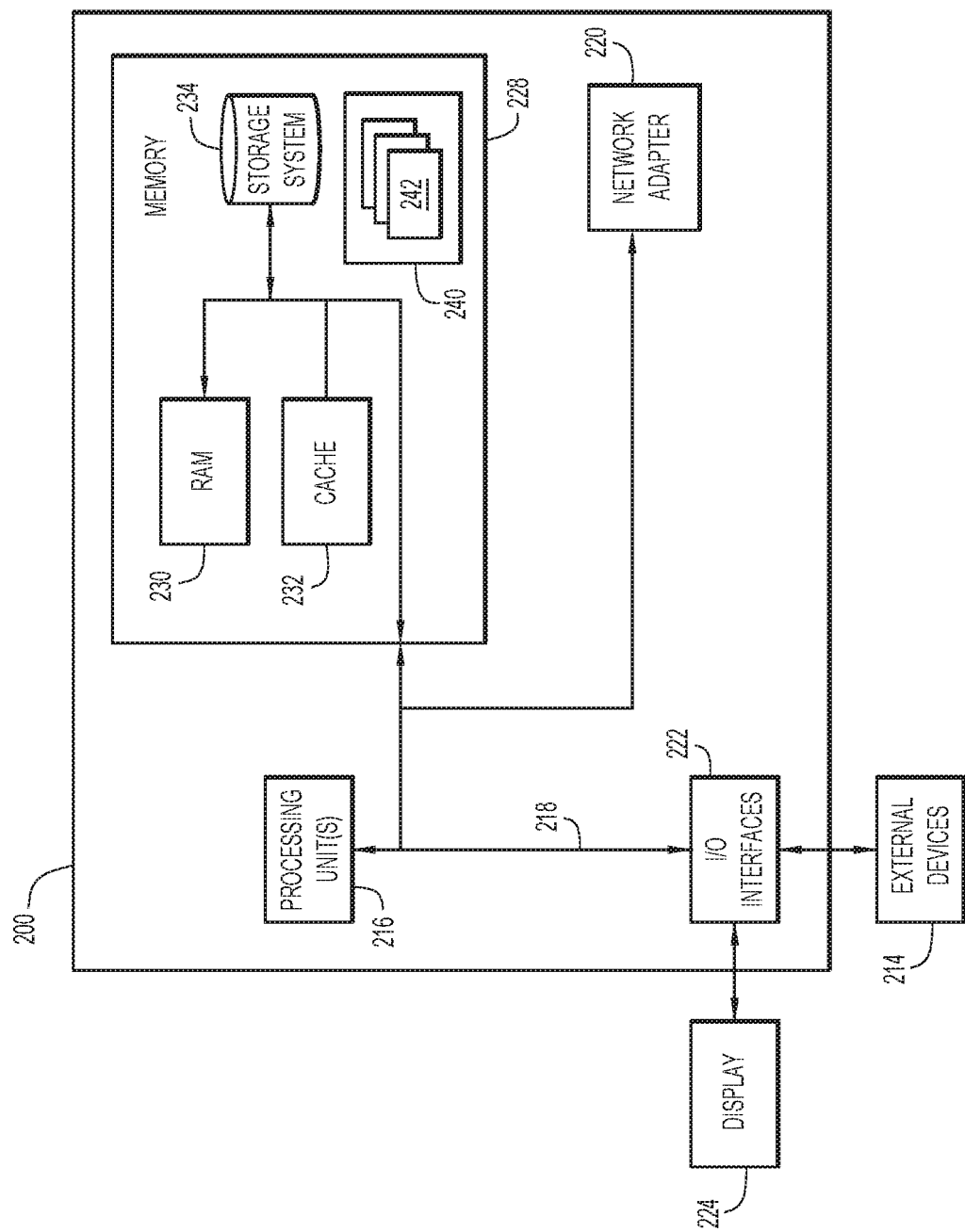
FIG. 2 is a block diagram of an example computing device according to an embodiment of the present invention.

Referring now to FIG. 2, a schematic of an example computer system 200 is shown, which may implement any of computing devices 104, 106 in various embodiments. Computer system 200 is shown in a form of a general-purpose computing device. Computer system 200 is operational with numerous other general purpose or special purpose computing system environments or configurations. Examples of well-known computing systems, environments, and/or configurations that may be suitable for use with computer system 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Components of computer system 200 may include, but are not limited to, one or more processors or processing units 216, a system memory 228, and a bus 218 that couples various system components including system memory 228 to one or more processing units 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 200 may include a variety of computer system readable media. Such media may be any available media that is accessible by computer system 200, and may include both volatile and non-volatile media, removable and non-removable media.

System memory 228 can include computer system readable media in the form of volatile memory, such as random access memory (RAM) 230 and/or cache memory 232. Computer system 200 may further include other removable/non-removable, volatile/non-volatile computer system storage media. By way of example only, storage system 234 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computer system 200 may also communicate with one or more external devices 214 such as a keyboard, a pointing device, one or more displays 224, one or more devices that enable a user to interact with computer system 200, and/or any devices (e.g., network card, modem, etc.) that enable computer system 200 to communicate with one or more other computing devices. Such communication can occur via Input/Output (I/O) interfaces 222. Still yet, computer system 200 can communicate with one or more networks such as a local area network (LAN), a general wide area network (WAN), and/or a public network (e.g., the Internet) via network adapter 220. As depicted, network adapter 220 communicates with the other components of computer system 200 via bus 218. It should be understood that, although not shown, other hardware and/or software components could be used in conjunction with computer system 200. Examples, include, but are not limited to: a microphone, one or more speakers, microcode, device drivers, redundant processing units, external disk drive arrays, RAID systems, tape drives, and data archival storage systems, etc.

Figure 3:
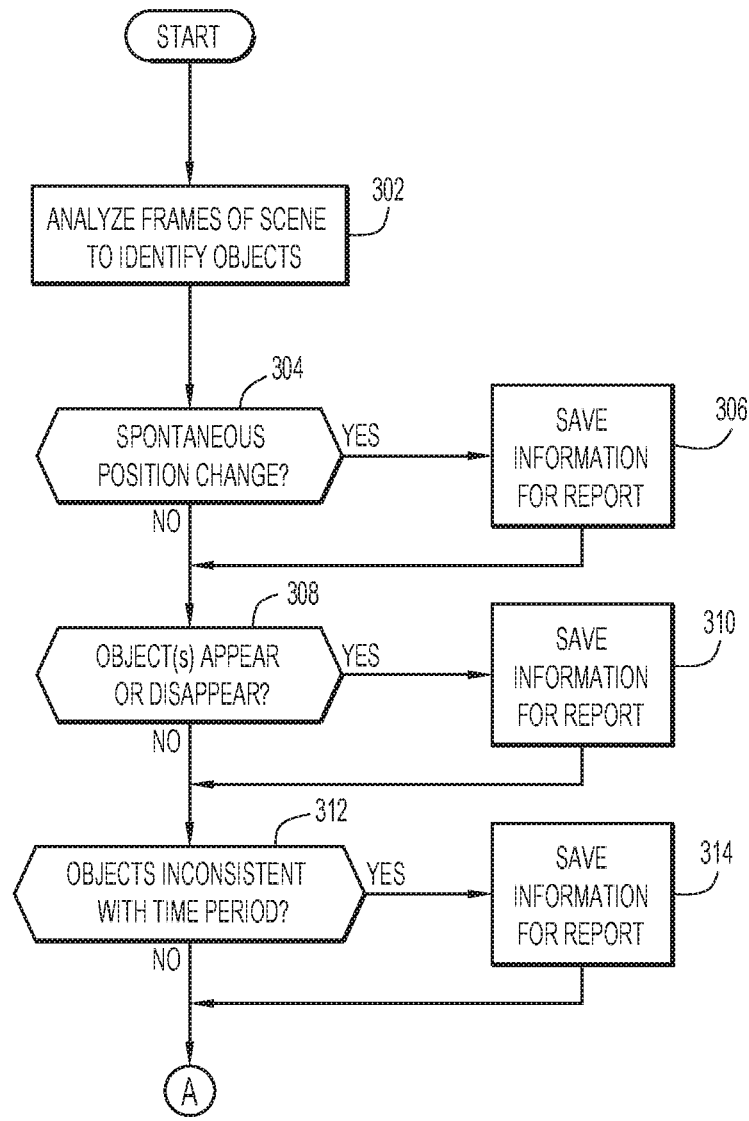
FIGS. 3-5 are flowcharts illustrating an example process for analyzing frames of a scene of a motion picture in order to find inconsistencies in the scene according to an embodiment of the present invention.

FIG. 3 is a flowchart of a process that may be executed by computing device 106 in various embodiments. The process may begin with computing device 106 analyzing digitized frames of a scene of a motion picture that may be received from computing device 104 via network 102. Each frame of the scene may be processed by one or more machine learning models to identify objects in the scene and a position of those objects (act 302). The one or more machine learning models may include a convolutional neural network as well as other machine learning models. The machine learning models may be trained using digitized frames of a one or more motion pictures that include intentional inconsistencies including, but not limited to, objects spontaneously appearing and disappearing from scenes, objects spontaneously changing shape or color, objects that are inconsistent with particular time periods, equipment, such as microphones, cameras, etc. appearing in scenes, camera operators appearing in scenes, objects that are inconsistent with a location of a scene or a time period of a scene, sounds that are inconsistent with the location of the scene or the time period of the scene.

Computing device 106 may determine a beginning of a scene from metadata that may be included with the motion picture or may be separate from the motion picture. For example, the metadata may be included in a separate file and may indicate timing regarding points at which each of the scenes of the motion picture begin. In some embodiments, if the motion picture is included in, for example, a video file, the video file may include the abovementioned metadata.

Computing device 106 may compare positions of identified objects within contiguous frames of a scene in order to determine whether any of the identified objects spontaneously changed their position (act 304). If at least some of the identified objects are determined to have spontaneously changed their position, computing device 106 may save information regarding the identified objects detected to have changed their positions, their previous positions, and the position to which they have spontaneously moved such that this information may be used to produce a report (act 306).

Next, computing device 106 may determine whether any of the identified objects have suddenly appeared or disappeared within the frames of the scene by comparing the contiguous frames (act 308). If at least one of the identified objects has been determined to have suddenly appeared or disappeared within the frames of the scene, then the computing device 106 may save information regarding the identified objects that have suddenly appeared or disappeared and may use this information to produce a report (act 310).

The metadata, which was previously mentioned, may further include information regarding a time period for one or more scenes of the motion picture. Computing device 106 may provide information regarding identified objects of each scene to a machine learning model trained to identify whether an object is or is not consistent with the time period for the scene (act 312). If any of the identified objects are determined to be inconsistent with the time period for the scene, information regarding those inconsistent identified objects may be saved for a report (act 314).

The metadata, which was previously mentioned, may further include information regarding a location of the scenes of the motion picture. Computing device 106 may provide information regarding the identified objects of each scene to a machine learning model trained to identify whether an object is or is not consistent with the location for the scene (act 402). If any of the identified objects are determined to be inconsistent with the location of the scene, information regarding those inconsistent identified objects may be saved for a report (act 404).

Computing device 106 may analyze a soundtrack of scenes in the motion picture, via at least one machine-learning model, to identify sounds (act 406). In some embodiments, the analyzed soundtrack may be digitized. Computing device 106 may determine whether any of the identified sounds are inconsistent with a time period or a location or both the time period and the location of the scene (act 408). If any of the identified sounds are determined to be inconsistent, then information regarding the inconsistent identified sounds may be saved for a report (act 410). Examples of inconsistent sounds may include sounds of automobiles in a pre-automobile time period, a ringing cell phone in a scene taking place during the Revolutionary War, video game sounds in a U.S. Civil War scene, etc.

In some embodiments, objects may have one or more attributes. For example, magic shoes may have an attribute, silence, due to their magical properties. Another example may be a genie with an attribute, green colored. Computing device 106 may determine whether any objects in a scene are inconsistent with any of their respective attributes (act 412). Continuing with the above examples to illustrate example objects inconsistent with their one or more attributes, the magic shoes may be noisy in one or more scenes, or the genie may be orange colored in some scenes. If any of the objects are determined to be inconsistent with their respective attributes, information regarding the objects and their inconsistent attributes may be saved for a report (act 414).

Natural language processing (NLP) may be performed by computing device 106 on the soundtrack or subtitles of scenes of a motion picture to determine whether one or more attributes are associated with an identified object (act 502). In some embodiments, when the soundtrack is processed, speech may be converted to text and natural language processing may be performed on the text. In some embodiments, subtitles may be in a form such as a digitized transcript on which natural language processing may be performed. If one or more attributes are determined to be associated with an identified object, then the determined one or more attributes associated with the identified object may be saved such that if the identified object is later detected to have violated the attribute, information regarding the identified object and the violated attribute may be saved to be included later in a report (act 504). For example, a character in a motion picture may say, "My magic shoes do not make any noise." As a result of performing natural language processing on the character's statement, an attribute such as "silent shoes" may be assigned to the character's shoes. At a later time, the character may be shown wearing the magic shoes, but the magic shoes may be noisy. As a result, information regarding the magic shoes violating the silent shoes attribute may be saved to be reported later in a report, which may indicate objects violating their respective attributes, a list of the associated attributes that are violated, and information regarding one or more scenes in which the attributes are violated.

Figure 4:
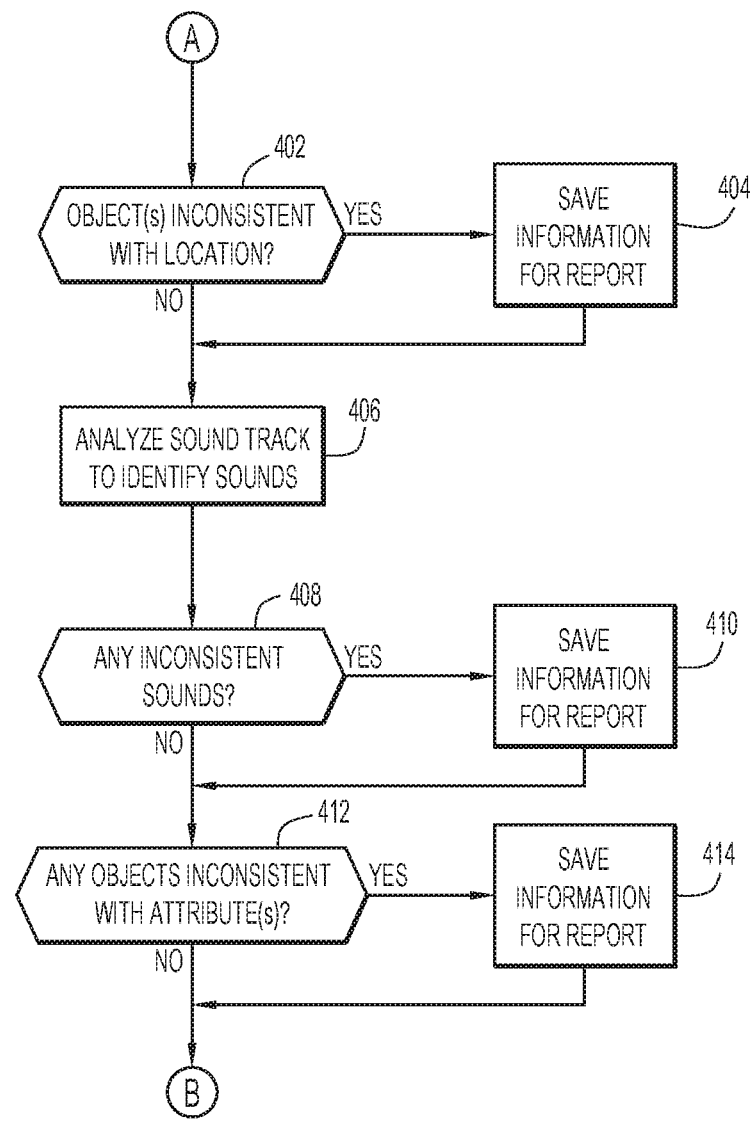
Figure 5:
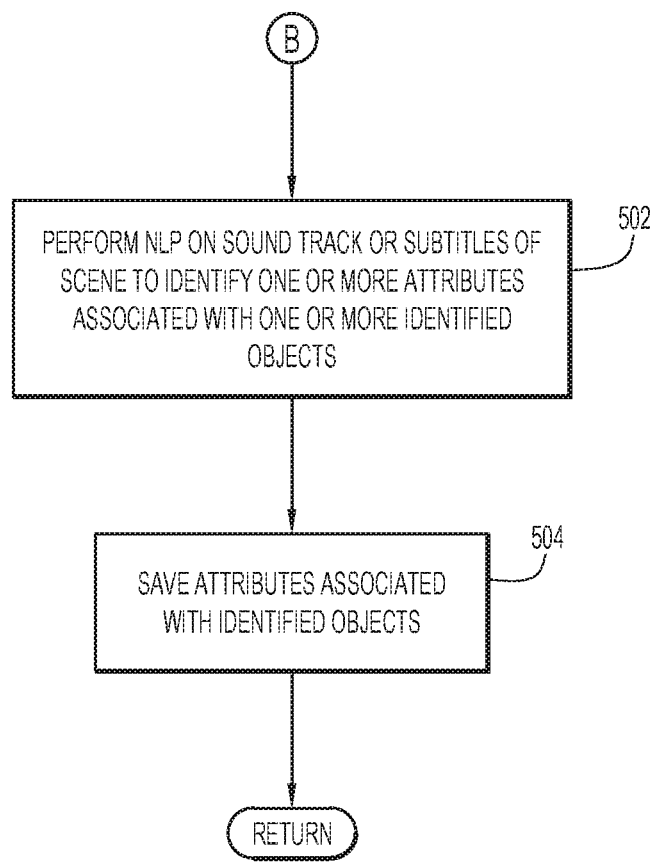

Although not explicitly shown in the process illustrated by FIGS. 3-5, other types of inconsistencies may be detected and information regarding these other type of inconsistencies may be included in a report. For example, an object changing color or shape in a scene may be detected and reported as an inconsistency.

Although FIGS. 3-5 show a number of acts being performed sequentially by computing device 106, in some embodiments computing device 106 may include a number of distributed computing devices for performing some of the acts in parallel and providing saved information for a report to a single computing device for reporting to a user at computing device 104. Alternatively, the produced report may be provided via other methods, which may include, but not be limited to, email, facsimile, text message, computer-generated voice, or other methods. In some embodiments, multiple distributed computing devices may analyze the frames of a scene to identify different types of objects. As an example, one computing device may identify objects smaller than a certain size, another computing device may identify large objects, a third computing device may identify clothing, a fourth computing device may identify shoes, etc. The respective computing devices may also identify spontaneous position changes of the respective identified objects as well as the a sudden appearance or disappearance of the respective identified objects in scenes. Another computing device may determine whether an identified object is consistent or inconsistent with a particular time period. Yet another computing device may identify sounds. An additional computing device may determine attributes associated with identified objects as well as whether the objects violate one or more associated attributes in scenes of the motion picture.

In some embodiments, a computing device may alter frames based on a report (e.g., adjust actions, remove out of place objects, etc.) This may be done by image processing to identify pixels of the scene images.

Figure 6:
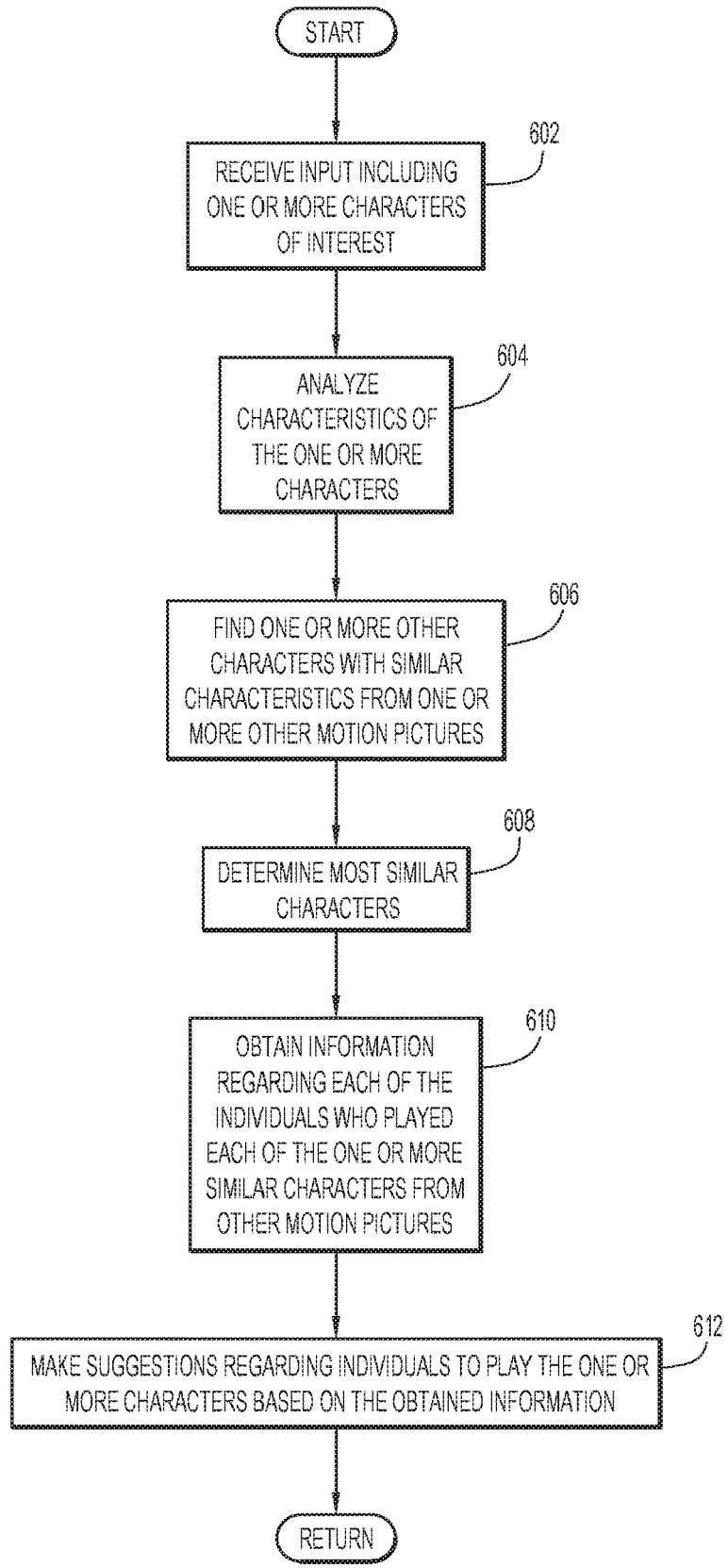
FIG. 6 is a flowchart of an example process for receiving information regarding one or more characters of interest of a motion picture and suggesting individuals to play the one or more characters of interest according to an embodiment of the present invention.

FIG. 6 is a flowchart of an example process that may be performed by computing device 106 in various embodiments to make suggestions regarding casting of one or more characters of a motion picture. The process may begin with computing device 106 receiving input including information regarding the one or more characters of interest for a motion picture (act 602). The input may be provided from user computing device 104, in some embodiments, and may include characteristics or attributes of the one or more characters such as, for example, sentiment, voice characteristics, physical characteristics, idiosyncrasies, etc. Alternatively, the characteristics or attributes of the one or more characters may be provided from a database. Computing device 106 may analyze the attributes (act 604) and may find one or more other characters with similar characteristics or attributes from one or more other motion pictures (act 606). Computing device 106 may perform act 606 in a number of different ways including, but not limited to, analyzing characteristics or attributes of one or more characters of motion pictures stored in a database, and receiving and processing input from multiple sources regarding motion pictures. The multiple sources may include movie reviews from newspapers and magazines, and postings from social media, as well as other sources.

In some embodiments, the characteristics or attributes of a character may be stored in a form of a vector, wherein each element of the vector represents a corresponding attribute and a value of each of the elements represents an aspect of the corresponding attribute. In such embodiments, attribute information regarding a character, which is received from one of the multiple sources may be converted to a vector of attributes for comparison purposes. Computing device 106 may compare one or more respective vectors corresponding to attributes of the one or more characters of interest to respective vectors of the one or more other characters from the one or more other motion pictures to determine which of the one or more other characters are most similar to a corresponding character of the one or more characters of interest (act 608). Similarity may be determined, in some embodiments, by a distance between two vectors. For example, if u and v are vectors, the distance between two vectors may be calculated according to:

$\sqrt{\Sigma_{i=1}^{n}(u_i-v_i)^2}$, where $u_i$ and $v_i$ are an $i^{th}$ element, respectively, of the vector u and the vector v. To use the above formula, attribute values may be converted to numerical values if not already in numerical form. A vector representing attributes of one of the one or more other characters having a smallest distance with respect to a vector representing attributes of one of the one or more characters of the motion picture may be considered a most similar vector.

Computing device 106 may obtain information regarding each individual who played each of the one of the one or more other characters based on the determined most similar vector (act 610). The information may be obtained from a database or from any one or more multiple online sources such as, for example, newspaper articles, movie reviews, social media, etc. Computing device 106 may then provide a suggestion regarding each of the individuals with respect to casting for the one or more characters (act 612). The suggestion may be displayed on a display screen of computing device 104 or may be provided via email, text message, computer-generated speech, or other methods.

Figure 7:
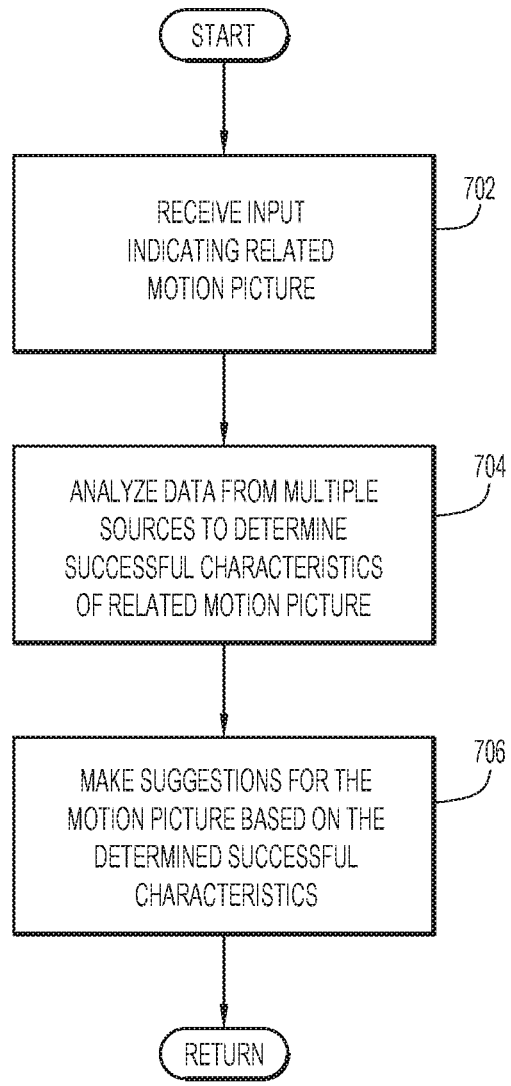
FIG. 7 is a flowchart that illustrates an example process for obtaining information regarding a related motion picture from multiple sources, analyzing the obtained information, and making suggestions for a motion picture based on determining successful characteristics of the related motion picture according to an embodiment of the present invention.

FIG. 7 is a flowchart of an example process that may be performed by computing device 106 for determining and making suggestions regarding a motion picture according to various embodiments. The process may begin with computing device 104 receiving input indicating a related motion picture (act 702). The related motion picture is another different motion picture, and may be a prequel or a sequel to the motion picture that is currently being made or is about to be made.

Next, computing device 106 may receive and analyze information from a number of sources to determine characteristics of the related motion picture that may have contributed to its success. The multiple sources may include online movie reviews, newspaper articles, magazine articles, social media, as well as other sources. Computing device 106 may analyze the input from the multiple sources for information about the related motion picture including, but not limited to, information regarding portions of the related motion picture that critics or moviegoers liked, favorite characters, favorite scenes, comments regarding set design, locations and time periods, characteristics regarding favorite characters, any inconsistencies, etc. The analysis may include natural language processing of textual input from the multiple sources to determine a subject of the textual input and to derive meaning from the textual input.

Based on results of the analysis step, computing device 106 may make suggestions for the motion picture (act 706). For example, the suggestions may include, but not be limited to, information about favorite scenes including characters in the scenes and one or more sentiments associated with the scenes, suggestions regarding including scenes similar to any of the favorite scenes, suggestions regarding actors for playing certain characters, suggestions regarding colors of objects and types of objects to be included in various scenes, and suggestions for maintaining consistency between the related other motion picture and the motion picture.

It will be appreciated that the embodiments described above and illustrated in the drawings represent only a few of the many ways of implementing embodiments for cognitive analysis of motion pictures.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., text analytics, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for processing a plurality of frames of a motion picture, the method comprising:

analyzing, by at least one computing device using one or more machine learning trained models, each of the plurality of frames of a scene to identify objects and respective positions of the identified objects in the scene;

determining, via at least one machine learning trained model, inconsistencies in the plurality of frames, wherein the inconsistencies include one or more from a group of:

a change of at least one position of the identified objects in the scene;

an appearance or disappearance of at least one of the identified objects in the scene based on contiguous frames of the plurality of frames; and at least one of the identified objects being inconsistent with respect to a time period of the scene; and providing, by the at least one computing device, resulting information regarding the determined inconsistencies in the plurality of frames to adjust the plurality of frames.

2. The computer-implemented method of claim 1, wherein the determining further comprises:
   determining whether the scene is inconsistent with a location of the scene, and
   the resulting information further includes information regarding any determined inconsistencies with respect to the location of the scene.

3. The computer-implemented method of claim 2, further comprising:
   detecting whether audio of the scene includes any sounds that are inconsistent with at least one from a group including the time period and the location of the scene, wherein
   the resulting information further includes information regarding the any sounds that are inconsistent with the at least one from the group including the time period and the location of the scene.

4. The computer-implemented method of claim 1, further comprising:
   performing natural language processing of at least one of spoken language and subtitles associated with one or more scenes of the motion picture to identify at least one attribute associated with an object; and
   determining whether any inconsistencies exist with respect to the at least one attribute of the object, wherein
   the resulting information includes information regarding the determined inconsistencies with respect to the at least one attribute of the object.

5. The computer-implemented method of claim 1, further comprising:
   analyzing characteristics of one or more characters of the motion picture, the one or more characters being selected based on received input;
   determining one or more other characters, from at least one other motion picture, having characteristics similar to the characteristics of corresponding characters of the one or more characters of the motion picture; and
   suggesting one or more individuals to play the one or more characters based on the determined one or more other characters.

6. The computer-implemented method of claim 5, wherein: the suggesting of the one or more individuals to play the one or more characters further comprises:
   analyzing input, from a plurality of sources, including financial information regarding a level of success of the at least one other motion picture, sentiment regarding the one or more other characters in the at least one other motion picture and information regarding one or more individuals who played the one or more other characters in the at least one other motion picture.

7. The computer-implemented method of claim 6, wherein the plurality of sources includes one or more from a group including social media, reviews of the at least one other motion picture, and entertainment news.

8. The computer-implemented method of claim 1, further comprising:
   determining, based on provided information, that the motion picture is related to a different motion picture;
   obtaining information regarding the different motion picture from a plurality of sources to determine characteristics of the different motion picture that are responsible for a success of the different motion picture; and
   making suggestions for the motion picture based on the determined characteristics of the different motion picture.

9. A system for processing a plurality of frames of a motion picture, the system comprising:
   at least one processor, and
   at least one memory, each of the at least one memory being connected with a respective processor of the at least one processor, the at least one processor being configured to perform:
      analyzing, using one or more machine learning trained models, each of the plurality of frames of a scene to identify objects and respective positions of the identified objects in the scene;
      determining, via at least one machine learning trained model, inconsistencies in the plurality of frames, wherein the inconsistencies include one or more from a group of:
         a change of at least one position of the identified objects in the scene;
         an appearance or disappearance of at least one of the identified objects in the scene based on contiguous frames of the plurality of frames; and
         at least one of the identified objects being inconsistent with respect to a time period of the scene; and
      providing resulting information regarding the determined inconsistencies in the plurality of frames to adjust the plurality of frames.

10. The system of claim 9, wherein the determining further comprises:
   determining whether the scene is inconsistent with a location of the scene, and
   the resulting information further includes information regarding any determined inconsistencies with respect to the location of the scene.

11. The system of claim 10, wherein the at least one processor is further configured to perform:
   detecting whether audio of the scene, including sounds and dialog, are inconsistent with at least one of the time period of the scene and the location of the scene, wherein
   the resulting information further includes information regarding the detected inconsistent sounds and the detected inconsistent dialog.

12. The system of claim 9, wherein the at least one processor is further configured to perform:
   natural language processing of at least one of spoken language and subtitles associated with one or more scenes of the motion picture to identify at least one attribute associated with an object; and
   determining whether any inconsistencies exist with respect to the at least one attribute of the object in a plurality of scenes of the motion picture, wherein
   the resulting information includes information regarding the determined inconsistencies with respect to the at least one attribute of the object.

13. The system of claim 9, wherein the at least one processor is further configured to perform:
   analyzing characteristics of one or more characters of the motion picture, the one or more characters being selected based on received input;
   determining one or more other characters, from at least one other motion picture, having characteristics similar to the characteristics of corresponding characters of the one or more characters of the motion picture; and suggesting one or more individuals to play the one or more characters based on the determined one or more other characters.

14. The system of claim 9, wherein the at least one processor is further configured to perform:
   determining, based on provided information, that the motion picture is related to a different motion picture;
   obtaining information regarding the different motion picture from a plurality of sources to determine characteristics of the different motion picture that are responsible for a success of the different motion picture; and
   making suggestions for the motion picture based on the determined characteristics of the different motion picture.

15. A computer program product for processing a plurality of frames of a motion picture, the computer program product comprising at least one computer readable storage medium having computer readable program code embodied therewith for execution on one or more processors, the computer readable program code being configured to be executed by the one or more processors to perform:
   analyzing, using one or more machine learning trained models, each of the plurality of frames of a scene to identify objects and respective positions of the identified objects in the scene;
   determining, via at least one machine learning trained model, inconsistencies in the plurality of frames, wherein the inconsistencies include one or more from a group of:
      a change of at least one position of the identified objects in the scene;
      an appearance or disappearance of at least one of the identified objects in the scene based on contiguous frames of the plurality of frames; and
      at least one of the identified objects being inconsistent with respect to a time period of the scene; and
   providing resulting information regarding the determined inconsistencies in the plurality of frames to adjust the plurality of frames.

16. The computer program product of claim 15, wherein the determining further comprises:
   determining whether the scene is inconsistent with a location of the scene.

17. The computer program product of claim 16, wherein the computer readable program code is further configured to be executed by the one or more processors to perform:
   detecting whether audio of the scene includes any sounds that are inconsistent with at least one from a group including the time period and the location of the scene, wherein
   the resulting information further includes information regarding the any sounds that are inconsistent with the at least one from the group including the time period and the location of the scene.

18. The computer program product of claim 15, wherein the computer readable program code is further configured to be executed by the one or more processors to perform:
   performing natural language processing of at least one of spoken language and subtitles associated with one or more scenes of the motion picture to identify at least one attribute associated with an object; and
   determining whether any inconsistencies exist in the motion picture with respect to the at least one attribute of the object.

19. The computer program product of claim 15, wherein the computer readable program code is further configured to be executed by the one or more processors to perform:
   determining, based on provided information, that the motion picture is related to a different motion picture;
   obtaining information regarding the different motion picture from a plurality of sources to determine characteristics of the different motion picture that are responsible for a success of the different motion picture; and
   making suggestions for the motion picture based on the determined characteristics of the different motion picture.

20. The computer program product of claim 19, wherein the plurality of sources includes one or more from a group including social media, motion picture reviews, and entertainment news.

* * * * *